United States Patent
Hsu

(10) Patent No.: US 7,516,096 B1
(45) Date of Patent: Apr. 7, 2009

(54) FABRICATION FACILITY MAJOR EXCURSION EVENT COST FORECAST MODEL

(75) Inventor: Liang-Pyng Hsu, Taipei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 1668 days.

(21) Appl. No.: 10/176,861

(22) Filed: Jun. 21, 2002

(51) Int. Cl.
*G06Q 40/00* (2006.01)
(52) U.S. Cl. .................................................. 705/36 R
(58) Field of Classification Search .................... 705/35, 705/36, 37
See application file for complete search history.

(56) References Cited

U.S. PATENT DOCUMENTS

| | | | |
|---|---|---|---|
| 5,450,317 A | 9/1995 | Lu et al. ..................... 364/402 |
| 5,467,265 A | 11/1995 | Yamada et al. .............. 364/154 |
| 6,110,214 A | 8/2000 | Klimasauskas ................. 703/2 |
| 6,487,459 B1 * | 11/2002 | Martin et al. .................. 700/44 |
| 6,591,255 B1 * | 7/2003 | Tatum et al. .................. 706/25 |
| 6,636,862 B2 * | 10/2003 | Lundahl et al. ............. 707/101 |
| 7,027,992 B2 * | 4/2006 | Zaccaria et al. ................ 705/4 |
| 7,080,026 B2 * | 7/2006 | Singh et al. .................. 705/10 |
| 7,305,351 B1 * | 12/2007 | Bechhofer et al. ............. 705/7 |
| 2002/0120558 A1 * | 8/2002 | Reid ............................ 705/38 |
| 2004/0064436 A1 * | 4/2004 | Breslin et al. ................. 707/1 |
| 2004/0215551 A1 * | 10/2004 | Eder ............................ 705/38 |

OTHER PUBLICATIONS

AUS Consultants, New Jersey: Impact of a continuing electricity crisis on the California economy, May 3, 2001, pp. i-iii, 1-22.*
"Introduction to Operations Research," Hillier and Lieberman, Holden-Day, Inc., San Francisco, CA, 1980, pp. 534-539.

* cited by examiner

*Primary Examiner*—Hani Kazimi
*Assistant Examiner*—Bijendra K Shrestha
(74) *Attorney, Agent, or Firm*—Haynes and Boone, LLP

(57) ABSTRACT

A system and method for forecasting the monetary impact resulting from non-predictable events within an enterprise begins by determining one or more monetary impact contributors attributable to the non-predictable events. The monetary impact of the contributors at the occurrence of previous non-predictable events is determined. A modeling function most likely to correspond to the monetary impact of the contributors at the occurrence of the previous non-predictable events is selected and the scaling coefficients for each of the contributors are calculated. The modeling function is then verified and an error function developed by the verifying to a deviation limit is compared to a deviation limit. If the error function exceeds the deviation limit, other modeling functions are selected and tested until the error function does not exceed the deviation limit. Once the deviation limit is not exceeded, a future monetary impact of upon occurrence of the non-predictable event is forecast.

31 Claims, 4 Drawing Sheets

COST HISTORY DATABASE — 10

| EVENT DATE | FAB | LOT | QUANT LOSS | U/C RAW MATERIAL | U/C RECOVERY | RAW MATERIAL COST | RECOVERY COST | TOTAL LOSS |
|---|---|---|---|---|---|---|---|---|
| | | | | | | | | |
| | | | | | | | | |
| | | | | | | | | |

FIG. 3

FABRICATION FACILITY MAJOR EXCURSION EVENT COST FORECAST MODEL

BACKGROUND OF THE INVENTION

1. Field of the Invention

This invention relates to systems and methods for determining the monetary impact of a non-predictable but recurring event. More particularly, this invention relates to systems and methods for determining a monetary cost due to a failure event such a loss of a power supply that causes fabrication facility such as a semiconductor fabrication line to cease operation.

2. Description of Related Art

U.S. Pat. No. 5,450,317 (Lu, et al.) provides a logistics planning method and system for recommending optimal order quantities and timing, choice of vendor locations and storage locations, and transportation modes, for individual items and for product families. The system is designed for use in cooperation with the computer having memory and incorporates item, customer, supplier, and routing information databases. In operation, the item, customer and supplier databases are accessed in order to provide customer and warehouse demand forecasts. The routing and customer databases are similarly accessed to provide transportation cost forecasts necessary to determine optimized routing modes for selected items, customers and suppliers. The demand and transportation costs are processed in accordance with a dynamic programming model to determine stock and non-stock order/shipment solutions for the selected items and customers, including optimized supplier and routing selection, order timing and quantity.

U.S. Pat. No. 5,467,265 (Yamada, et al.) teaches a system for determining an effective and practical operation method for thermal source equipments includes a fundamental plan data storage unit, a fundamental plan generating unit for determining a fundamental operation plan of each equipment while minimizing an operation cost by linear programming, an operation knowledge storage unit for storing operation knowledge such as equipment performance characteristics and operation know-how, a fundamental plan evaluating unit for evaluating the fundamental plan, a modifying rule storage unit for storing modifying rules used for modifying the evaluated fundamental plan, and a fundamental plan modifying unit for modifying the fundamental plan in accordance with the modifying rules.

U.S. Pat. No. 6,110,214 (Klimasauskas) describes an analyzer for modeling and optimizing maintenance operations. A first model or first analyzer having a series of filters is provided to represent time-varying effects of maintenance events. The first model or analyzer further enhances the selection of derived variables, which are used as inputs to the first analyzer. Additionally, a combination of fuzzy logic and statistical regression analyzers are provided to better model the equipment and the maintenance process. An optimizer with a bi-modal optimization process, which integrates discrete maintenance events with continuous process variables is also provided. The optimizer determines the time and the type of maintenance activities, which are to be executed, as well as the extent to which the maintenance activities can be postponed by changing other process variables. Thus, potential modifications to process variables are determined to improve the current performance of the processing equipment as it drifts out of tolerance.

SUMMARY OF THE INVENTION

An object of this invention is to provide method for forecasting a monetary impact resulting from non-predictable events within an enterprise.

To accomplish this and other objects, a method for forecasting the monetary impact resulting from non-predictable events within an enterprise begins by determining one or more monetary impact contributors attributable to the non-predictable events. The monetary impact of the contributors at the occurrence of previous non-predictable events is determined. A modeling function most likely to correspond to the monetary impact of the contributors at the occurrence of the previous non-predictable events is selected and the scaling coefficients for each of the contributors are calculated.

The modeling function is then verified and an error function developed by the verifying to a deviation limit is compared to a deviation limit. If the error function exceeds the deviation limit, other modeling functions are selected and tested until the error function does not exceed the deviation limit. Once the deviation limit is not exceeded, a future monetary impact of upon occurrence of the non-predictable event is forecast.

The monetary impact is a cost to the enterprise and the non-predictable event is a power outage resulting in cessation in operation of a fabrication facility within the enterprise. The cessation in operation of the fabrication facility results in the monetary impact from costs that include raw material loss and recovery costs. In the case of a semiconductor fabrication facility the raw material is electronic component substrates and the recovery costs are the costs of removal and repair of the electronic component fabricating equipment processing the substrates.

The modeling function may be either linear or nonlinear mathematical functions. The deviation limit is a measure of the adequacy or degree of fit of the modeling function for forecasting the monetary impact when compared to the actual monetary impact of the contributors at the occurrence of previous non-predictable events.

BRIEF DESCRIPTION OF THE DRAWINGS

FIG. 3 is a diagram of the contents of the cost history database of FIG. 1

DETAILED DESCRIPTION OF THE INVENTION

The process of forecasting is well known in the art and is used to predict a future outcome based on prior history. A forecast may be based on an "educated guess" of personnel closely involved with the day-to-day activities of the process being forecast. Alternately, the forecast maybe based on prior historic data of the process being forecast. There are a number of methods for performing the forecast, including a last value of the process used to predict the future value, an average of all past values, a moving average of certain number of past values of the process, exponential smoothing using known curve fitting routines to determine a function for the changes in the values of the process.

In general the forecasting problem as cited from *Introduction to Operation Research*, Hillier and Lieberman, Holden-Day, Inc. San Francisco, Calif., 1980, pp. 534-539 is:

"There exists a sequence of random variables $X_1, X_2, \ldots$ (a stochastic process) having expected values given by $E(X_1), E(X_2), \ldots$. The distribution of each of these random variables may be the same, or they may be changing (e.g. shifting) according to some pattern. The random variables may be independent. Observations on these random variables $X_1, X_2, \ldots, X_t$ have been taken, and their values are denoted by $x_1, x_2, \ldots, x_t$. Based on these previous outcomes, $E(X_t)$ is to be estimated; the estimate, which will be used as the forecast for subsequent periods will be denoted as $\hat{E}(X_t)$."

It is common for the data of previous outcomes of the stochastic process to be stored in a computing system as a database of information describing the variables and the results of the process caused by the variables. There are various programming products such as spreadsheets like EXCEL from Microsoft Corporation, Redmond, Oreg., which are used to calculate the expected values for use to provide the future forecast.

In a semiconductor fabrication facility, a major excursion or outage of the main power supply system can cause severe damage to semiconductor substrates being processed to form integrated circuits. A major power excursion or outage of the semiconductor fabrication facility causes a severe impact to the profit and loss statement of the enterprise. Therefore it is desirable to be able to forecast with reasonable accuracy the future impact of the damage.

Generally, the main contributing factors during a major power excursion event are the costs of the semiconductor wafers or substrates and the removal and restoration costs to repair any equipment damaged during the excursion. The estimation of these costs previously was primarily manually determined. This required a long process time and had a high degree of inaccuracy.

Figure 1:
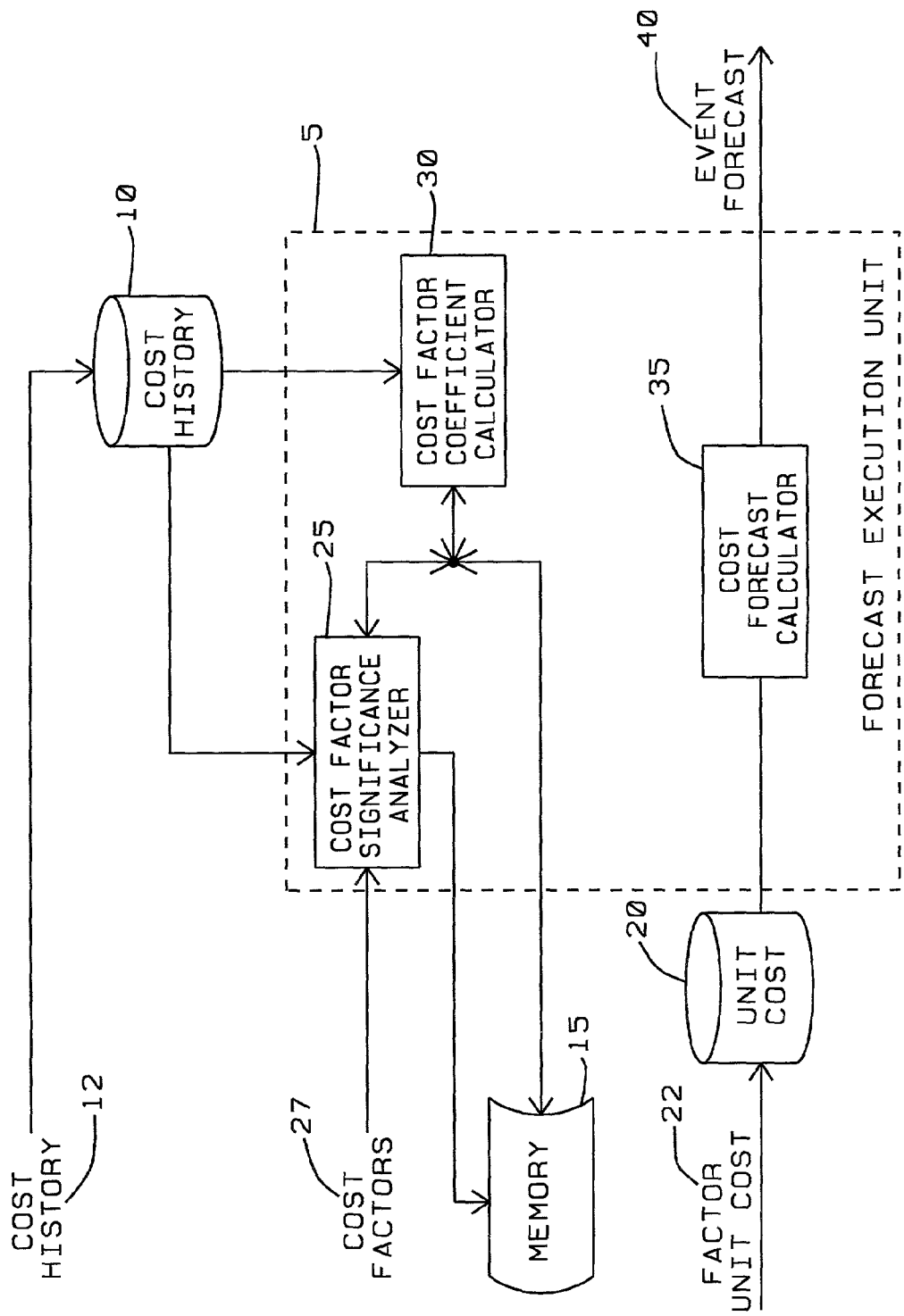
FIG. 1 is a block diagram of a system for forecasting a monetary impact resulting from non-predictable events within an enterprise of this invention.

The system and method of this invention provides a model that determines regressively the costs of a major event such as a power outage based on the prior costs of such events. Refer now to FIG. 1 for a description of a forecasting system for estimating a monetary impact resulting from non-predictable events within an enterprise. The monetary impact being the costs incurred as a result of a major power excursion event (the non-predictable events) within a semiconductor fabrication facility (enterprise).

The forecasting system has a forecast execution unit 5, which is used to identify and determine the significance of each contributory factor that impacts the profit or loss resulting from a particular event excursion. In the preferred embodiment of this invention, the event excursion is a power outage and the contributory factors are the cost factors resulting from the power outage. The previous cost history 12 from prior power outages is transferred to a cost history database 10. The cost history database 10 is in communication with the cost factor significance analyzer 25. The cost significance analyzer 25 receives an input of the potential cost factors 27, provides a statistical analysis of the potential cost factors using the data of the cost history database 10.

Refer to FIG. 3 for a discussion of the structure of the cost history database 10. The cost history database 10 details the date and time of occurrence of the event. The fabrication line within the facility identifies the location of the event. The lot identifier identifies the lot of the semiconductor wafers that were damaged during the event. The quantity of the loss is the number of wafers damaged and lost during the event. The unit cost of the material is the basic cost of the wafers and the unit cost of the recovery indicates the cost of removal and restoration of the equipment in preparation for restarting the fabrication line. The raw material cost is the unit cost of the wafer multiplied by the number of wafers and is the total cost for the raw material lost in the event. The recovery cost is the unit cost of the recovery multiplied by the number of wafers to determine the total recovery cost attributable to an event. The total loss is the sum of the raw material cost and the recovery cost. The raw material cost and the recovery cost being the two major contributing factors to the loss resulting from the power outage event.

The cost significance analyzer 25 is in communication with a memory 15. Upon completion of the analysis of the potential cost factors and selection of the appropriate cost factors, the cost significance analyzer 25 transfers the most significant contributory cost factors to the memory 15. The cost factor coefficient calculator 30 then retrieves the contributory cost factors from the memory 15 and determines a function of the contributory cost factors that describes best the predicted total cost. The cost factor coefficient calculator 30 can have external input to chose which function should have a best fit. The cost factor coefficient calculator 30 then determines the coefficient with the statistical deviation describing the quality of the fit. Alternately, the cost coefficient calculator 30 determines the function having the best fit based on statistical error functions. The cost coefficient calculator 30 transfers the cost factor coefficients and the deviation calculations to the memory 15.

Figure 4:
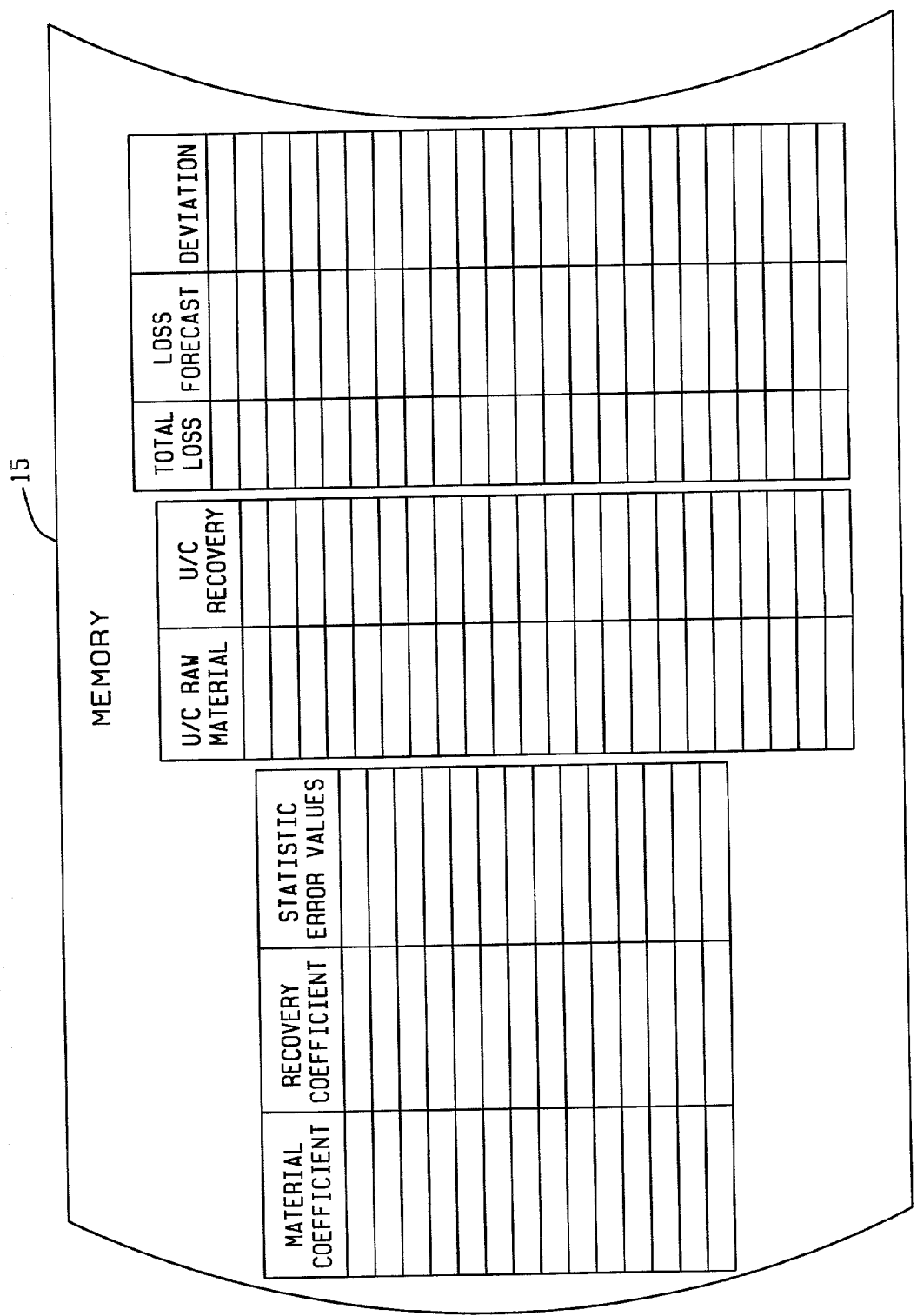
FIG. 4 is diagram of the contents of the memory of FIG. 1.

The structure of the contents of the memory 15 is shown in FIG. 4. For a system forecasting the monetary impact of a power outage event within a semiconductor fabrication facility, the memory contains the material cost coefficient, the recovery cost coefficient, and the statistical error values. The statistical error values describe the quality of fit for the coefficients.

The cost forecast calculator 35 extracts the cost factor coefficients from the memory 15 to calculate an event forecasted cost 40 of a future event. In the case of the semiconductor fabrication facility, the forecasted cost 40 is the total expected cost of a future power outage event. The cost forecast calculator 35 is in communication with unit cost database 20. The unit cost database 20 contains the current unit costs of the contributing cost factors. These cost factors 22 are provided externally to the unit cost database 20.

In addition to the future event forecast, the cost forecast calculator 35 retrieves the unit costs of the cost factors to determine a "predicted" cost for the previous events. The predicted cost is compared to the actual total cost and the difference or deviation is determined. The cost forecast calculator 35 places these predictions in the memory 15 for review by displays or systems in communication with the forecasting system of this invention.

Returning to FIG. 4, the memory 15, as described above, has the history of the unit cost of material and cost of recovery for the prior power outage events as extracted by the cost factor coefficient calculator 30. The total loss is also extracted from the cost history database 10 by the cost factor coefficient calculator 30 and placed in the memory 15. The cost forecast calculator 35 forecasts the loss based on the raw material cost and the recovery costs and then calculates the deviation from the actual total loss.

While the above functions are described as separate entities and can be constructed as such, in reality the system as described would be a computing system having a magnetic or optical media containing the database information a memory as described, and a central processing unit which when programmed appropriately assumes the functions as described.

Figure 2:
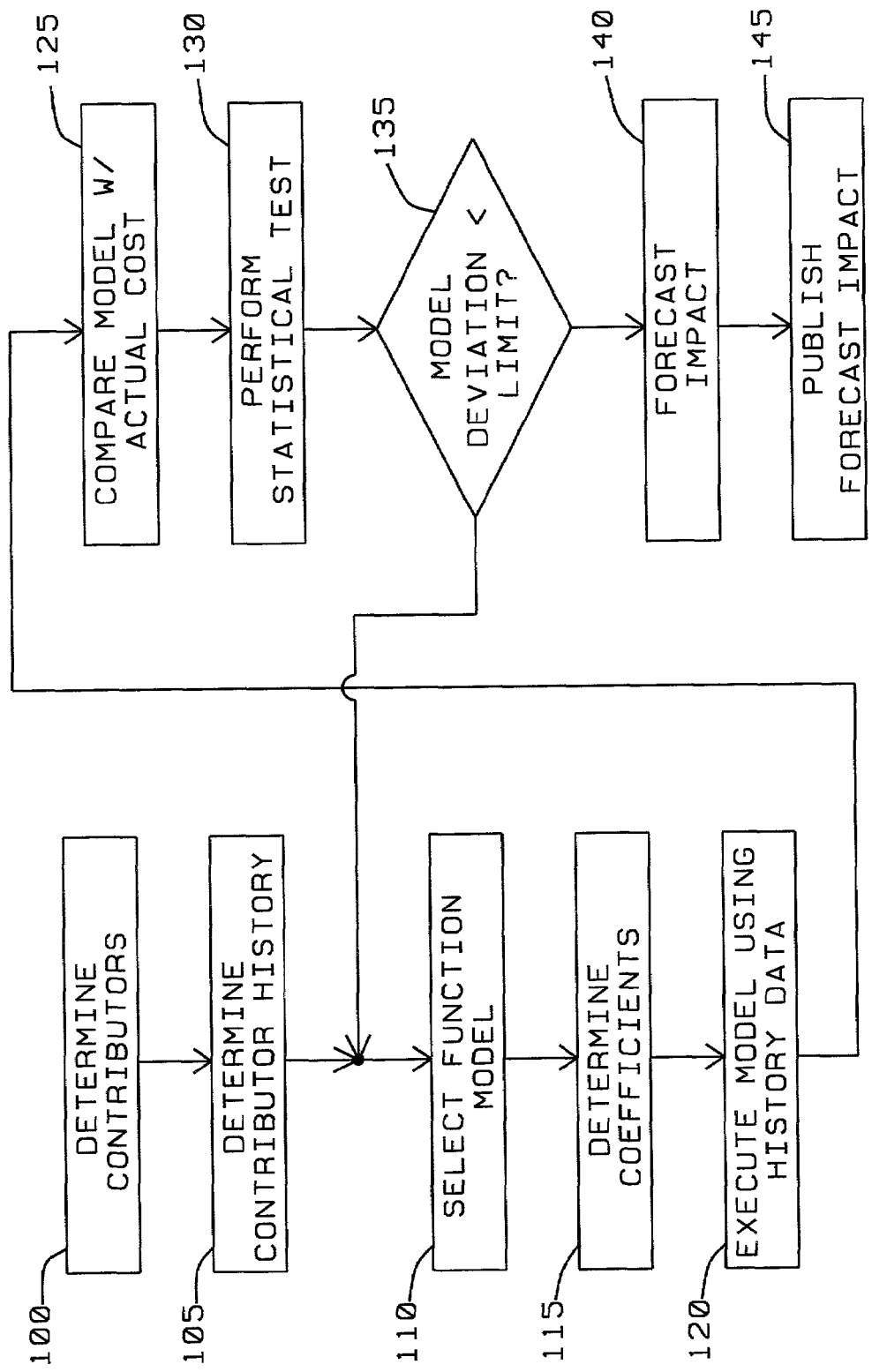
FIG. 2 is a flow diagram of the method for method for forecasting a monetary impact resulting from non-predictable events within an enterprise of this invention.

The structure of the method for forecasting the monetary impact of an event of this invention is shown in FIG. 2. The major contributing factors significantly determining the monetary impact are determined (Box 100). In the case of the semiconductor facility, the contributing factors are the costs of the wafers and the cost of recovery and restoration of the equipment. Thus the cost impact of each power outage excursion is the sum of the costs of the wafers destroyed and the costs for the recovery. The monetary impact of each of the contributory factors for all previous events is determined (Box 105). In this case the cost impact of the previous power outage excursions is recorded for evaluation.

The monetary impact for the previous events is examined and a suitable function describing these events is selected (Box 110). As described above, the previous event cost could be used for the prediction. Alternately, the absolute average or running average could be employed as a predictor for the forecast. In the alternative and most preferable, a smoothing function could be chosen to describe a mathematical equation describing the contributing factors that determine the final costs. The smoothing function could be a linear mathematical function or non-linear mathematical function and use known curve fitting algorithms to determine the function. In the case where the event is a power outage within a semiconductor fabrication facility, the cost factors are the cost of the wafers and the cost of the recovery and a simple linear least squares fit is generally adequate to forecast the impact of the power outage event.

The coefficients of the each of the contributing factors are determined (Box 115). Any appropriate curve fitting method can be selected to provide the appropriate coefficients with the measurement of the degree of fit.

The modeling function with the determined coefficients is executed (Box 120) using the data from the previous event occurrences. The calculated monetary impact as predicted by the modeling function is compared (Box 125) to the actual monetary impact. A statistical test such as a Students-t test or an F test is performed (Box 130) to determine a quality or level of deviation. An alternate could be just a simple average of the deviations of the previous monetary impacts versus the predicted monetary impact. In the case of the costs of a power outage for a semiconductor fabrication facility, the costs of previous power outages are compared to the predicted cost and the deviation determined. An average of the deviations is determined.

The results of the statistical test are compared (Box 135) to a deviation limit. If the deviation limit is exceeded, a different function model is selected 110 and validated for fit. However, if the deviation limit is not exceeded the future monetary impact is forecast 140 and published 145. In the case of the power outage at the semiconductor fabrication facility, the deviation limit is based on the average of the deviations of the predicted costs versus the actual costs. The limit being determined from experience of the supervisory personnel.

It is well known in the art that while the above describes a method and system for forecasting a monetary impact resulting from non-predictable events within an enterprise, the method as described is, in fact, implemented as program code for execution on a computing system. The program code is retained in media such as storage nodes of the cluster network of computer systems or a global communication network such as the Internet, or stored on storage media such as a random access memory (RAM), a read only memory (ROM), an electro-optical disk or a magnetic disk. The program code executed by the computing system executes the procedure in the method of FIG. 2

While this invention has been particularly shown and described with reference to the preferred embodiments thereof, it will be understood by those skilled in the art that various changes in form and details may be made without departing from the spirit and scope of the invention.

The invention claimed is:

1. A computer implemented method for forecasting a monetary impact resulting from at least one non-predictable event within an enterprise, comprising the steps of:
   a) statistically determining by computer means one or more monetary impact contributors from a group of potential cost factors, wherein said contributors are attributable to said non-predictable events event;
   b) querying a cost history database for the monetary impact of said contributors at occurrences of previous non-predictable events, wherein the monetary impact of said contributors comprises actual cost data;
   c) automatically selecting one of a plurality of modeling functions most likely to correspond to said monetary impact of said contributors at the occurrences of previous non-predictable events;
   d) computing scaling coefficients for each of said contributors;
   e) verifying said modeling function;
   f) statistically comparing an error function developed by said verifying to an a deviation limit;
   g) if said error function exceeds said deviation limit, automatically selecting another one of the plurality of modeling functions and executing steps d) through f) until said error function does not exceed said deviation limit; and
   h) forecasting a future monetary impact upon an occurrence of said non-predictable event by inputting a current monetary impact of said contributors into a modeling function selected using steps c) through g).

2. The method of claim 1 wherein the monetary impact contributors include raw material loss and equipment recovery and restoration costs.

3. The method of claim 2 wherein the raw material is electronic component substrates.

4. The method of claim 3 wherein the recovery costs are the costs of removal and repair of the electronic component fabricating equipment processing said substrates.

5. The method of claim 1 wherein the modeling function is selected from the group of modeling functions consisting of linear mathematical functions and nonlinear mathematical functions.

6. The method of claim 1 wherein the deviation limit is a measure of the adequacy of said modeling function for forecasting said monetary impact.

7. An apparatus for forecasting a monetary impact resulting from a non-predictable event within an enterprise, comprising:
   a) means for statistically determining one or more monetary impact contributors from a group of potential cost factors, wherein said contributors are attributable to said non-predictable events event;
   b) means for querying a cost history database for the monetary impact of said contributors at occurrences of previous non-predictable events, wherein the monetary impact of said contributors comprises actual cost data;
   c) means for automatically selecting one of a plurality of modeling functions most likely to correspond to said monetary impact of said contributors at the occurrences previous non-predictable events;

d) means for computing scaling coefficients for each of said contributors;

e) means for verifying said modeling function;

f) means for statistically comparing an error function developed by said verifying to a deviation limit;

g) means for automatically selecting another one of the plurality of modeling functions and executing steps d) through f) until said error function does not exceed said deviation limit, if said error function exceeds said deviation limit; and h) means for forecasting a total future monetary impact of upon an occurrence of said non-predictable event by inputting a current monetary impact of said contributors into a modeling function selected using steps c) through g).

8. The apparatus of claim 7 wherein the monetary impact contributors include raw material loss and equipment recovery and restoration costs.

9. The apparatus of claim 8 wherein the raw material is electronic component substrates.

10. The apparatus of claim 9 wherein the recovery costs are the costs of removal and repair of the electronic component fabricating equipment processing said substrates.

11. The apparatus of claim 7 wherein the modeling function is selected from the group of modeling functions consisting of linear mathematical functions and nonlinear mathematical functions.

12. The apparatus of claim 7 wherein the deviation limit is a measure of the adequacy of said modeling function for forecasting said monetary impact.

13. A forecasting system for estimating a total monetary impact resulting from a non-event within an enterprise, comprising:

a) a factor significance analyzer connected to receive a listing of impact potential cost factors for statistically determining and selecting contributory significance of one or more monetary impact contributors attributable to said non-predictable event;

b) a history database in communication with the factor significance analyzer containing the monetary impact of said one or more contributors at occurrences of previous non-predictable events;

c) a memory in communication with the factor significance analyzer to receive and retain the one or more contributors;

d) a contributory factor coefficient calculator in communication with the history database and the memory, said contributory factor coefficient calculator executing the steps of:

selecting a modeling function most likely to correspond to said monetary impact of said one or more contributors at the occurrences of previous non-predictable events, computing scaling coefficients for each of said one or more contributors, verifying said modeling function, statistically comparing an error function developed by said verifying to a deviation limit, and placing said scaling coefficients to said memory;

e) a unit costing database connected for receiving unit costing of each one or more contributors; and f) a forecasting calculator connected to the memory and the unit costing database to determine a total future monetary impact upon an occurrence of said non-predictable event.

14. The forecasting system of claim 13 wherein the one or more monetary impact contributors include raw material loss and equipment recovery and restoration costs.

15. The forecasting system of claim 14 wherein the raw material is electronic component substrates.

16. The forecasting system of claim 15 wherein the recovery costs are the costs of removal and repair of the electronic component fabricating equipment processing said substrates.

17. The forecasting system of claim 13 wherein the modeling function is selected from the group of modeling functions consisting of linear mathematical functions and nonlinear mathematical functions.

18. The forecasting system of claim 13 wherein the deviation limit is a measure of the adequacy of said modeling function for forecasting said monetary impact.

19. A computing system for estimating a total monetary impact resulting from a non-predictable events event within an enterprise, comprising:

a history database connected to receive and retain a listing of contributory factors and a monetary impact of the contributory factors at occurrences of previous non-predictable events;

a memory connected to receive and retain a contributory factor significance for each of the contributory factors;

a unit costing database connected for receiving unit costing of each contributory factor; and an execution unit for determining contributory factor significance, calculating contributory factor scaling units, and forecasting a total monetary impact resulting from a non-predictable events, said execution unit comprising:

a factor significance analyzer connected to receive a listing of contributory factors for determining contributory factor significance of one or more said contributory factors attributable to said occurrences of previous non-predictable events;

a contributory factor coefficient calculator in communication with the history database and the memory, said contributory factor coefficient calculator executing the steps of:

selecting a modeling function most likely to correspond to said monetary impact of said contributory factors at the occurrences of previous non-predictable events, computing scaling coefficient for each of said contributory factors, verifying said modeling function, statistically comparing an error function developed by said verifying to an a deviation limit, and placing said scaling coefficients to said memory; and a forecasting calculator connected to the memory and the unit costing database to determine a future total monetary impact upon an occurrence of said non-predictable event.

20. The computing system of claim 19 wherein the monetary contributory factors include raw material loss and equipment recovery and restoration costs.

21. The computing system of claim 20 wherein the raw material is electronic component substrates.

22. The computing system of claim 21 wherein the recovery costs are the costs of removal and repair of the electronic component fabricating equipment processing said substrates.

23. The computing system of claim 22 wherein the modeling function is selected from the group of modeling functions consisting of linear mathematical functions and nonlinear mathematical functions.

24. The computing system of claim 19 wherein the deviation limit is a measure of the adequacy of said modeling function for forecasting said monetary impact.

25. A medium for retaining a computer program which, when executed on a computing system, executes a process for forecasting an overall monetary loss resulting from a non-predictable power outage within a semiconductor fabrication facility, said program comprising the steps of:

a) selecting at least a first and a second cost component from a plurality of cost components, wherein the plurality of cost components comprises all cost components which contribute to a total monetary loss;

b) verifying that the first and second cost components are statistically significant cost components;

c) retrieving actual costs for the first and second cost components and for the total monetary loss, wherein said actual costs correspond to previous power outages;

d) selecting a first one of a plurality of modeling functions likely to fit the actual costs;

e) computing first and second coefficients for the respective first and second cost components;

f) populating a table containing actual total monetary losses for said previous power outages, forecasted total monetary losses for said previous power outages, and errors derived from comparing the actual monetary losses to the forecasted total monetary losses;

g) comparing a standard deviation of the errors to an acceptance deviation, and if over, selecting another one of the plurality of modeling functions and executing steps e) through f) until the standard deviation of the errors does not exceed the acceptance deviation;

h) passing the first and second coefficients and a selected modeling function into a memory; and i) upon occurrence of a power outage event, querying a current cost component database for current actual costs for the first and second cost components, retrieving the first and second coefficients and the selected modeling function from the memory, and forecasting the overall monetary loss.

26. The medium of claim 25 wherein the plurality of cost components includes raw material loss and equipment recovery and restoration costs.

27. The medium of claim 26 wherein the raw material is electronic component substrates.

28. The medium of claim 27 wherein the recovery costs are the costs of removal and repair of the electronic component fabricating equipment processing said substrates.

29. The medium of claim 25 wherein the plurality of modeling functions of comprises linear mathematical functions and nonlinear mathematical functions.

30. The medium of claim 25 wherein the standard deviation is a measure of the adequacy of said modeling function for forecasting said monetary impact.

31. The medium of claim 25 wherein said medium is selected from a group of media consisting of storage nodes of a network of computer systems, a random access memory (RAM), a read only memory (ROM), an electro-optical disk, and a magnetic disk.

* * * * *